(12) United States Patent
Suehiro et al.

(10) Patent No.: US 12,140,946 B2
(45) Date of Patent: Nov. 12, 2024

(54) CONTROL DEVICE, CONTROL METHOD, AND NON-TRANSITORY COMPUTER-READABLE RECORDING MEDIUM

(71) Applicant: TOYOTA JIDOSHA KABUSHIKI KAISHA, Toyota (JP)

(72) Inventors: Yuki Suehiro, Ichikawa (JP); Takahiro Ito, Tama (JP); Naoya Kaneko, Kita-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 18/155,149

(22) Filed: Jan. 17, 2023

(65) Prior Publication Data

US 2023/0288926 A1 Sep. 14, 2023

(30) Foreign Application Priority Data

Mar. 14, 2022 (JP) .................................. 2022-039383

(51) Int. Cl.
*G05D 1/00* (2006.01)

(52) U.S. Cl.
CPC .......... *G05D 1/0038* (2013.01); *G05D 1/0016* (2013.01); *G05D 1/0022* (2013.01)

(58) Field of Classification Search
CPC .. G05D 1/0038; G05D 1/0016; G05D 1/0022; G08C 17/02
USPC ............................................................ 701/2
See application file for complete search history.

(56) References Cited

U.S. PATENT DOCUMENTS

| 2021/0409650 A1 | 12/2021 | Kobayashi et al. | |
|---|---|---|---|
| 2022/0009511 A1* | 1/2022 | Matsunaga | H04W 48/06 |
| 2022/0242447 A1* | 8/2022 | Nagura | B60W 50/0098 |
| 2022/0291742 A1 | 9/2022 | Otsuka | |
| 2023/0176572 A1* | 6/2023 | Suehiro | G06V 20/56 701/2 |

FOREIGN PATENT DOCUMENTS

| JP | H10-112861 A | 4/1998 |
|---|---|---|
| JP | 2005-222307 A | 8/2005 |
| JP | 2018-120443 A | 8/2018 |
| JP | 2021-56783 A | 4/2021 |
| WO | 2020/090285 A1 | 5/2020 |

* cited by examiner

*Primary Examiner* — Muhammad Shafi
(74) *Attorney, Agent, or Firm* — Oliff PLC

(57) ABSTRACT

A moving body is a target of a remote operation performed by a remote operator and has a plurality of cameras. A control device acquires a plurality of video data respectively captured by the plurality of cameras, as transmission target data to be transmitted to a remote operator terminal. The control device acquires information on a communication speed of a communication from the moving body to the remote operator terminal. The control device determines whether data reduction is necessary for limiting a total amount of data of the plurality of video data per second to the communication speed or less. When it is determined that the data reduction is necessary, the control device reduces an amount of transmission data of at least one of the plurality of video data such that the total amount of data is limited to the communication speed or less.

9 Claims, 11 Drawing Sheets

1: REMOTE OPERATION SYSTEM

| AMOUNT OF EXCESS | COMMUNICATION STATE | FIX LEVEL |
|---|---|---|
| NEGATIVE ↑ XN | EXCELLENT | +1 |
| X0 | NORMAL | 0 (default) |
| XP | BAD | -1 |
| ↓ POSITIVE | POTENTIALLY BLACKOUT | -2 |

*FIG. 8*

CONTROL DEVICE, CONTROL METHOD, AND NON-TRANSITORY COMPUTER-READABLE RECORDING MEDIUM

CROSS-REFERENCE TO RELATED APPLICATION

This application claims priority to Japanese Patent Application No. 2022-039383 filed on Mar. 14, 2022, the entire contents of which are incorporated by reference herein.

BACKGROUND

Technical Field

The present disclosure relates to a remote operation of a moving body performed by a remote operator. In particular, the present disclosure relates to a technique for controlling transmission of video data from a moving body being a target of a remote operation.

Background Art

Patent Literature 1 discloses an in-vehicle communication device. The in-vehicle communication device supports both a mobile communication method and a WiFi communication method. When an abnormality of the vehicle is detected, the in-vehicle communication device transmits numerical data and image data indicating a vehicle travel status to a specified server. At this time, the in-vehicle communication device transmits the numerical data by the mobile communication method and transmits the image data by the WiFi communication method.

As other technologies related to communication of an image captured by a camera, those disclosed in Patent Literature 2 and Patent Literature 3 are known.

LIST OF RELATED ART

Patent Literature 1: Japanese Laid-Open Patent Application Publication No. JP-2018-120443
Patent Literature 2: Japanese Laid-Open Patent Application Publication No. JP-2005-222307
Patent Literature 3: Japanese Laid-Open Patent Application Publication No. JP-H10-112861

SUMMARY

A remote operation of a moving body (e.g., a vehicle, a robot) performed by a remote operator is considered. In the remote operation of the moving body, video data captured by a camera installed on the moving body are transmitted to a remote operator terminal on the remote operator side. Here, when a communication speed decreases, a transmission delay of the video data may increase. The increase in the transmission delay of the video data may lead to delays in determination and an operation performed by the remote operator and thus cause decrease in accuracy of the remote operation.

An object of the present disclosure is to provide a technique capable of suppressing a transmission delay of video data transmitted from a moving body, in a remote operation of the moving body performed by a remote operator.

A first aspect is directed a control device for controlling a moving body.

The moving body is a target of a remote operation performed by a remote operator and has a plurality of cameras.

The control device includes one or more processors.

The one or more processors acquire a plurality of video data respectively captured by the plurality of cameras, as transmission target data to be transmitted to a remote operator terminal on a side of the remote operator.

The one or more processors acquire information on a communication speed of a communication from the moving body to the remote operator terminal.

The one or more processors determine whether or not data reduction is necessary for limiting a total amount of data of the plurality of video data per second to the communication speed or less.

When it is determined that the data reduction is necessary, the one or more processors execute a data amount coordinating process that reduces an amount of transmission data of at least one of the plurality of video data such that the total amount of data is limited to the communication speed or less.

A second aspect is directed to a control method for controlling a moving body.

The moving body is a target of a remote operation performed by a remote operator and has a plurality of cameras.

The control method includes:
  acquiring a plurality of video data respectively captured by the plurality of cameras, as transmission target data to be transmitted to a remote operator terminal on a side of the remote operator;
  acquiring information on a communication speed of a communication from the moving body to the remote operator terminal;
  determining whether or not data reduction is necessary for limiting a total amount of data of the plurality of video data per second to the communication speed or less; and
  when it is determined that the data reduction is necessary, executing a data amount coordinating process that reduces an amount of transmission data of at least one of the plurality of video data such that the total amount of data is limited to the communication speed or less.

A third aspect is directed to a control program executed by a computer for controlling a moving body.

The moving body is a target of a remote operation performed by a remote operator and has a plurality of cameras.

The control program, when executed by a computer, causes the computer to:
  acquire a plurality of video data respectively captured by the plurality of cameras, as transmission target data to be transmitted to a remote operator terminal on a side of the remote operator;
  acquire information on a communication speed of a communication from the moving body to the remote operator terminal;
  determine whether or not data reduction is necessary for limiting a total amount of data of the plurality of video data per second to the communication speed or less; and
  when it is determined that the data reduction is necessary, execute a data amount coordinating process that reduces an amount of transmission data of at least one of the plurality of video data such that the total amount of data is limited to the communication speed or less.

According to the present disclosure, the communication speed of the communication from the moving body to the remote operator terminal is taken into account. Then, the data amount coordinating process is executed such that the total amount of data of the plurality of video data per second is limited to the communication speed or less. Executing the data amount coordinating process makes it possible to suppress a transmission delay of the video data transmitted from the moving body. Since the transmission delay of the video data is suppressed, delays in determination and an operation performed by the remote operator are suppressed as well. That is, it is possible to suppress decrease in accuracy of the remote operation caused by the transmission delay. This is preferable from a viewpoint of improvement in safety of the remote operation of the moving body.

BRIEF DESCRIPTION OF DRAWINGS

FIG. 8 is a conceptual diagram for explaining an example of setting of a Fix level according to an embodiment of the present disclosure;

EMBODIMENTS

Embodiments of the present disclosure will be described with reference to the accompanying drawings.

1. Overview of Remote Operation System

A remote operation (remote driving) of a moving body is considered. Examples of the moving body being a target of the remote operation include a vehicle, a robot, a flying object, and the like. The vehicle may be an autonomous driving vehicle or may be a vehicle driven by a driver. Examples of the robot include a logistics robot, a work robot, and the like. Examples of the flying object include an airplane, a drone, and the like.

As an example, in the following description, a case where the moving body being the target of the remote operation is a vehicle will be considered. When generalizing, "vehicle" in the following description shall be deemed to be replaced with "moving body."

Figure 1:
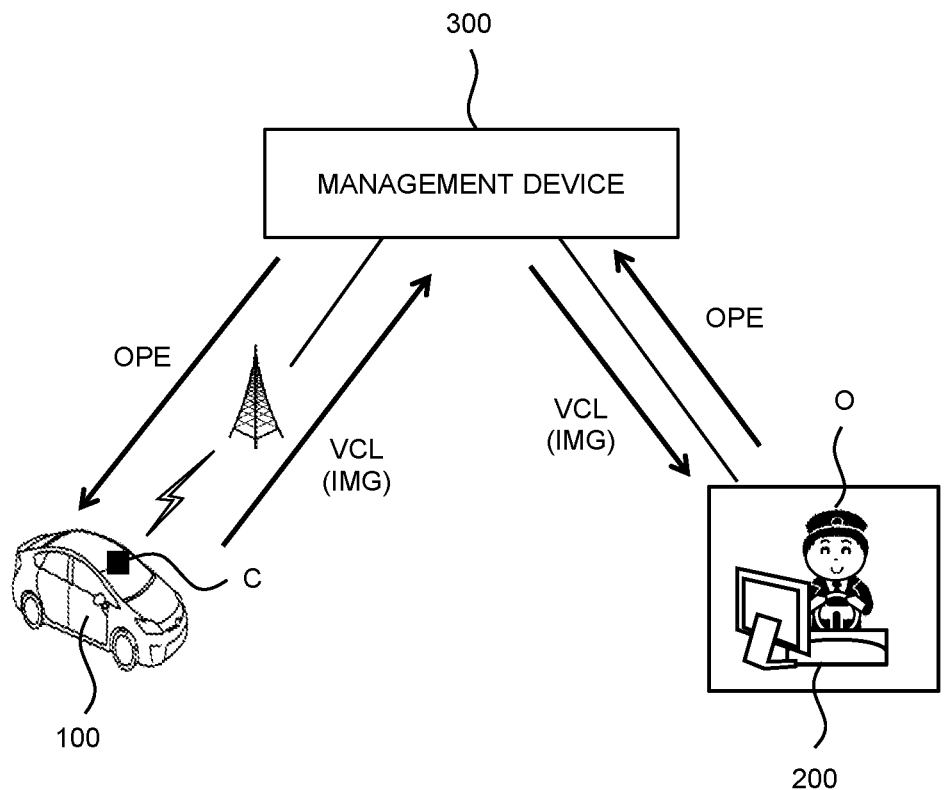
FIG. 1 is a schematic diagram showing a configuration example of a remote operation system according to an embodiment of the present disclosure.

FIG. 1 is a schematic diagram showing a configuration example of a remote operation system 1 according to the present embodiment. The remote operation system 1 includes a vehicle 100, a remote operator terminal 200, and a management device 300. The vehicle 100 is the target of the remote operation. The remote operator terminal 200 is a terminal device used by a remote operator O when remotely operating the vehicle 100. The remote operator terminal 200 can also be referred to as a remote operation human machine interface (HMI). The management device 300 manages the remote operation system 1. The management of the remote operation system 1 includes, for example, assigning a remote operator O to a vehicle 100 that requires the remote operation. The management device 300 is able to communicate with the vehicle 100 and the remote operator terminal 200 via a communication network. Typically, the management device 300 is a management server on a cloud. The management server may be configured by a plurality of servers that perform distributed processing.

Various sensors including a camera C are installed on the vehicle 100. The camera C images a situation around the vehicle 100 to acquire an image IMG indicating the situation around the vehicle 100. Vehicle information VCL is information acquired by the various sensors and includes the image IMG captured by the camera C. The vehicle 100 transmits the vehicle information VCL to the remote operator terminal 200 via the management device 300. That is, the vehicle 100 transmits the vehicle information VCL to the management device 300, and the management device 300 transfers the received vehicle information VCL to the remote operator terminal 200.

The remote operator station 200 receives the vehicle information VCL transmitted from the vehicle 100. The remote operator terminal 200 presents the vehicle information VCL to the remote operator O. More specifically, the remote operator terminal 200 includes a display device, and displays the image IMG and the like on the display device. The remote operator O views the displayed information, recognizes the situation around the vehicle 100, and performs the remote operation of the vehicle 100. The remote operation information OPE is information relating to the remote operation performed by the remote operator O. For example, the remote operation information OPE includes an amount of operation performed by the remote operator O. The remote operator terminal 200 transmits the remote operation information OPE to the vehicle 100 via the management device 300. That is, the remote operator terminal 200 transmits the remote operation information OPE to the management device 300, and the management device 300 transfers the received remote operation information OPE to the vehicle 100.

The vehicle 100 receives the remote operation information OPE transmitted from the remote operator terminal 200. The vehicle 100 performs vehicle travel control in accordance with the received remote operation information OPE. In this manner, the remote operation of the vehicle 100 is realized.

2. Overview of Data Amount Coordinating Process

As an example of the image IMG captured by the camera C installed on the vehicle 100, video data (video stream data) S are considered hereinafter. In a case where the vehicle 100 has a plurality of cameras C1 to Cn (n is an integer equal to or greater than 2), a plurality of video data S1 to Sn are captured by the plurality of cameras C1 to Cn, respectively. The vehicle 100 transmits the plurality of video data S1 to Sn to the remote operator terminal 200 in parallel. The remote operator terminal 200 receives the plurality of video data S1 to Sn in parallel and displays the plurality of video data S1 to Sn on the display device. The remote operator O views the displayed video data S, recognizes the situation around the vehicle 100, and performs the remote operation of the vehicle 100.

When a communication speed (communication bandwidth) of the communication from the vehicle 100 to the remote operator terminal 200 decreases, a transmission delay of the video data S1 to Sn may increase. The increase in the transmission delay of the video data S1 to Sn may lead to delays in determination and an operation performed by the remote operator O and thus cause decrease in accuracy of remote operation. Therefore, there is a demand for a technique capable of suppressing the transmission delay of the video data S1 to Sn transmitted from the vehicle 100. According to the present embodiment, in order to suppress the transmission delay of the video data S1 to Sn transmitted from the vehicle 100, a "data amount coordinating process" described below is performed as necessary.

Figure 2:
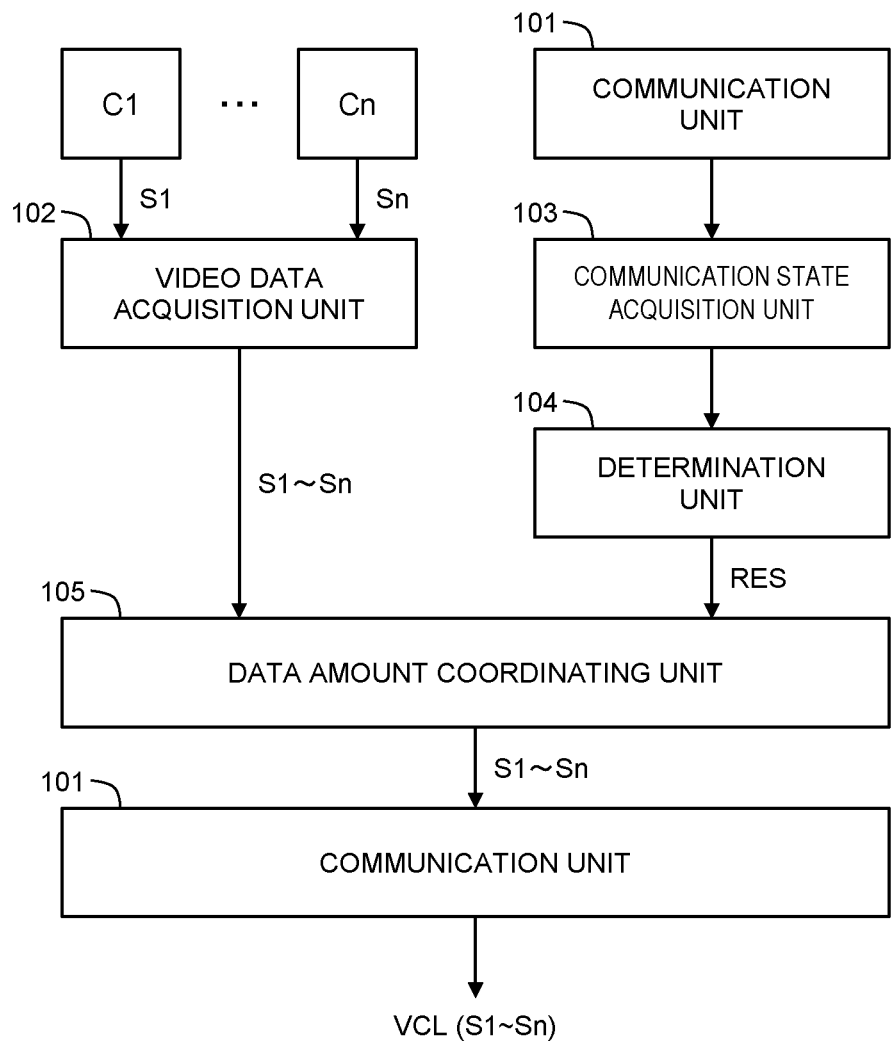
FIG. 2 is a block diagram showing an example of a functional configuration related to a data amount coordinating process according to an embodiment of the present disclosure.

FIG. 2 is a block diagram showing an example of a functional configuration related to the data amount coordinating process according to the present embodiment. The vehicle 100 includes, as functional blocks, a communication unit 101, a video data acquisition unit 102, a communication state acquisition unit 103, a determination unit 104, and a data amount coordinating unit 105.

The communication unit 101 communicates with the remote operator terminal 200 via the management device 300.

The video data acquisition unit 102 acquires the plurality of video data (video stream data) S1 to Sn respectively captured by the plurality of cameras C1 to Cn installed on the vehicle 100. The plurality of video data S1 to Sn are transmission target data to be transmitted in parallel from the vehicle 100 to the remote operator terminal 200.

The communication state acquisition unit 103 monitors the communication with the remote operator terminal 200 by the communication unit 101. Then, the communication state acquisition unit 103 acquires information on a communication speed (communication bandwidth) of the communication with the remote operator terminal 200 based on a result of the communication with the remote operator terminal 200 by the communication unit 101. In particular, the communication state acquisition unit 103 acquires information on a communication speed Z of the communication from the vehicle 100 to the remote operator terminal 200. The communication speed Z here is, for example, a throughput. For example, the communication state acquisition unit 103 is able to measure the communication speed Z (throughput) based on an amount of transmission data transmitted to the remote operator terminal 200 and feedback from the remote operator terminal 200. It should be noted that various methods for measuring the communication speed and the throughput have been proposed, and a method in the present embodiment is not limited in particular.

The communication speed Z varies with time. In a situation where the communication speed Z is decreased, the transmission delay of the video data S1 to Sn may increase. In particular, when the communication speed Z becomes lower than a total amount of data Y of the plurality of video data S1 to Sn per second, the transmission delay increases.

The determination unit 104 determines whether or not the total amount of data Y of the plurality of video data S1 to Sn per second exceeds the communication speed Z. In other words, the determination unit 104 determines whether or not data reduction is necessary for limiting the total amount of data Y of the plurality of pieces of video data S1 to Sn per second to the communication speed Z or less.

For example, a default value Y0 of the total amount of data Y of the plurality of video data S1 to Sn per second is given as known information. A default value $Y0\_i$ of a data amount of each video data S1 ($i=1$ to n) per second is given by "a default value $F0\_i$ of a data amount per frame"×"a default value $R0\_i$ of a frame rate." A total sum of the default values $Y0\_1$ to $Y0\_n$ regarding the plurality of video data S1 to Sn is the default value Y0 of the total amount of data Y of the plurality of video data S1 to Sn per second. An amount of excess X of the default value Y0 of the total amount of data Y with respect to the communication speed Z is expressed by the following Equation (1).

$$X \text{ [bps]} = Y0 \text{ [bps]} - Z \text{ [bps]} \qquad \text{Equation (1):}$$

The determination unit 104 compares the default value Y0 of the total amount of data Y with the varying communication speed Z. When the default value Y0 of the total amount of data Y exceeds the communication speed Z, the determination unit 104 determines that the data reduction is necessary. That is, when the varying communication speed Z becomes lower than the default value Y0 of the total amount of data Y, the determination unit 104 determines that the data reduction is necessary. In other words, when the amount of excess X represented by the above Equation (1) is a positive value, the determination unit 104 determines that the data reduction is necessary.

The determination unit 104 outputs determination result information RES indicating the result of determination. The determination result information RES may include the amount of excess X represented by the above Equation (1).

The data amount coordinating unit 105 receives the plurality of video data S1 to Sn and the determination result information RES. When the determination result information RES indicates that the data reduction is necessary, the data amount coordinating unit 105 executes the data amount coordinating process. More specifically, the data amount coordinating unit 105 reduces an amount of transmission data of at least one of the plurality of video data S1 to Sn such that the total amount of data Y of the plurality of video data S1 to Sn per second is limited to the communication speed Z or less. Here, a total amount of reduction in the amount of transmission data is equal to or greater than the amount of excess X represented by the above Equation (1).

As a method for reducing an amount of transmission data of certain video data Sj ($j$=any of 1 to n), various methods are conceivable. For example, an amount of the video data Sj per frame is set to a value smaller than the default value $F0\_j$. For example, a resolution (the number of pixels) of the video data Sj is set to a value lower than a default value. For example, when the default value of the resolution of the video data Sj is 1080p, the resolution is lowered to 360p. As a result, the amount of transmission data of the video data Sj becomes about ⅑.

In order to further reduce the amount of transmission data of the video data Sj, the transmission of the video data Sj may be stopped. In other words, the amount of transmission data of the video data Sj may be set to 0.

The communication unit 101 transmits the vehicle information VCL including the plurality of video data S1 to Sn to the remote operator terminal 200. It should be noted that when the data amount coordinating process is performed, the amount of transmission data of certain video data Sj may become 0.

Figure 3:
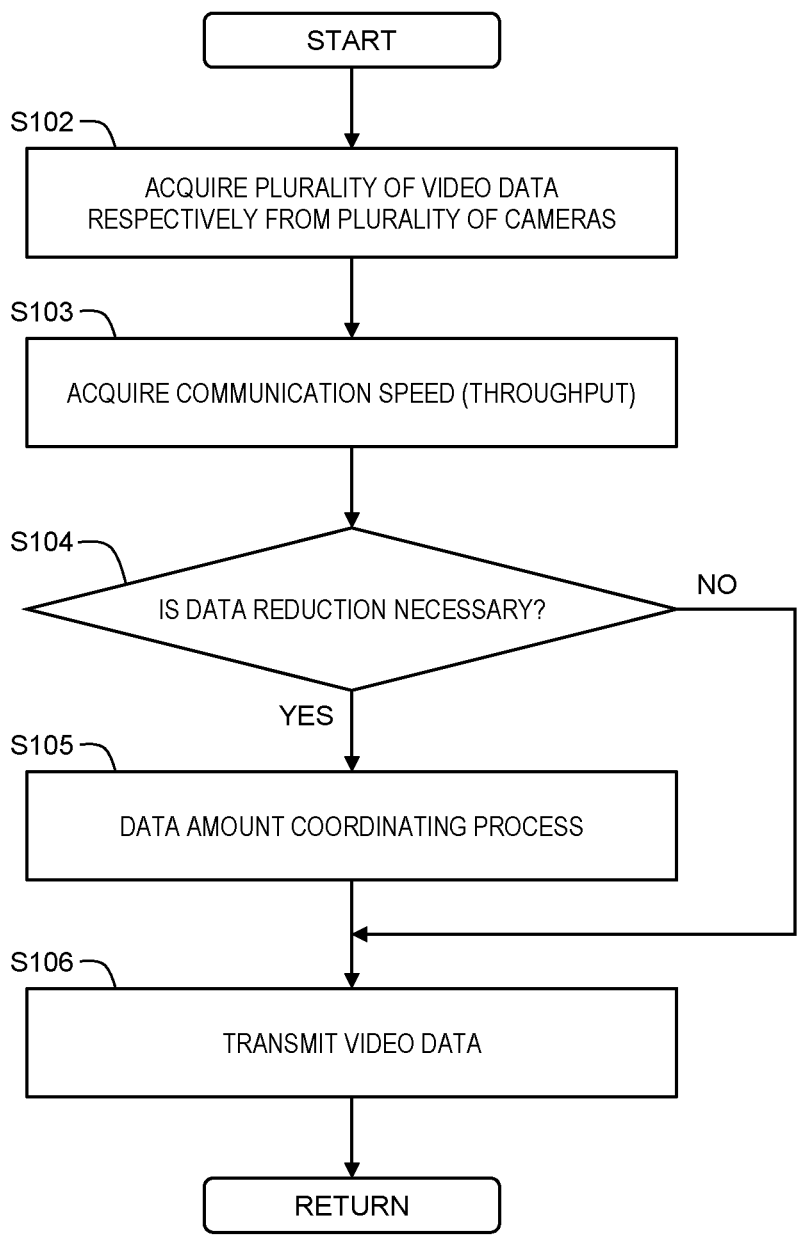
FIG. 3 is a flowchart showing processing related to the data amount coordinating process according to an embodiment of the present disclosure.

FIG. 3 is a flowchart summarizing the processing related to the data amount coordinating process.

In Step S102, the vehicle 100 acquires the plurality of video data S1 to Sn respectively captured by the plurality of cameras C1 to Cn, as the transmission target data.

In Step S103, the vehicle 100 acquires the information on the communication speed Z of the communication from the vehicle 100 to the remote operator terminal 200 based on the result of the communication with the remote operator terminal 200.

In Step S104, the vehicle 100 determines whether or not the data reduction is necessary for limiting the total amount of data Y of the plurality of video data S1 to Sn per second to the communication speed Z or less. When it is determined that the data reduction is necessary (Step S104; Yes), the processing proceeds to Step S105. On the other hand, when the data reduction is not necessary (Step S104; No), the processing proceeds to Step S106.

In Step S105, the vehicle 100 executes the data amount coordinating process. More specifically, the vehicle 100 reduces the amount of transmission data of at least one of the plurality of video data S1 to Sn such that the total amount of data Y of the plurality of video data S1 to Sn per second is limited to the communication speed Z or less.

In Step S106, the vehicle 100 transmits the vehicle information VCL including the plurality of video data S1 to Sn to the remote operator terminal 200.

As described above, according to the present embodiment, the communication speed Z of the communication from the vehicle 100 to the remote operator terminal 200 is taken into account. Then, the data amount coordinating process is executed such that the total amount of data Y of the plurality of video data S1 to Sn per second is limited to the communication speed Z or less. Executing the data amount coordinating process makes it possible to suppress the transmission delay of the video data S1 to Sn transmitted from the vehicle 100. Since the transmission delay of the video data S1 to Sn is suppressed, delays in determination and an operation performed by the remote operator 0 are suppressed as well. That is, according to the present embodiment, it is possible to suppress decrease in accuracy of the remote operation caused by the transmission delay. This is preferable from a viewpoint of improvement in safety of the remote operation of vehicle 100.

3. Data Amount Coordinating Process Considering Camera Priority

Priority of the cameras C1 to Cn may be considered in the data amount coordinating process. More specifically, the data amount coordinating process may be performed such that the amount of transmission data of the video data S captured by a camera C with a higher priority becomes larger.

Figure 4:
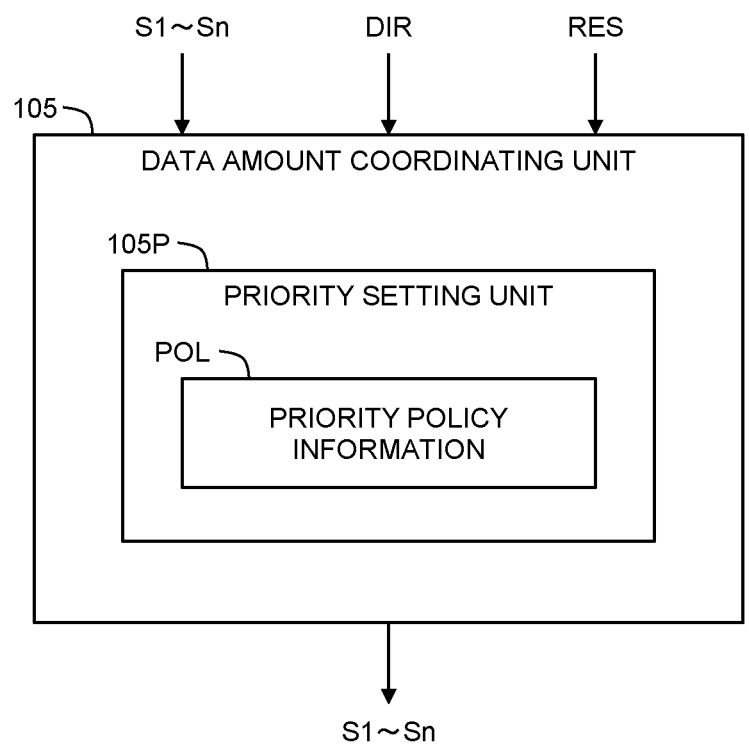
FIG. 4 is a block diagram for explaining the data amount coordinating process considering camera priority according to an embodiment of the present disclosure.

FIG. 4 is a block diagram showing the data amount coordinating process considering the priority of the cameras C1 to Cn. The data amount coordinating unit 105 includes a priority setting unit 105P. The priority setting unit 105P sets the priority of the plurality of cameras C1 to Cn. More specifically, the priority setting unit 105P holds priority policy information POL indicating a setting policy of the priority of the plurality of cameras C1 to Cn. The priority setting unit 105P sets the priority of the plurality of cameras C1 to Cn based on the priority policy information POL. Then, the data amount coordinating unit 105 executes the data amount coordinating process such that the amount of transmission data of the video data S captured by a camera C having a higher priority becomes larger. That is, the data amount coordinating unit 105 secures the amount of transmission data of the video data S captured by a camera C with a high priority as much as possible while suppressing the total amount of data Y of the video data S1 to Sn.

Generalization is as follows. The priority of a first camera Ci is higher than the priority of a second camera Cj, and the priority of the second camera Cj is lower than the priority of the first camera Ci. First video data S1 are the video data S captured by the first camera Ci having the higher priority. Second video data Sj are the video data S captured by the second camera Cj having the lower priority. The data amount coordinating unit 105 executes the data amount coordinating process such that the amount of transmission data of the first video data S1 becomes larger than the amount of transmission data of the second video data Sj. For example, the data amount coordinating unit 105 reduces resolution of the second video data Sj to be lower than a default value without reducing the amount of transmission data of the first video data Si. As another example, the data amount coordinating unit 105 transmits the first video data S1 and stops the transmission of the second video data Sj. In this manner, the data amount coordinating unit 105 executes the data amount coordinating process so that the amount of transmission data of the first video data S1 captured by the first camera Ci having the higher priority becomes larger.

The priority of the plurality of cameras C1 to Cn may be fixed or may be dynamically changed.

Figure 5:
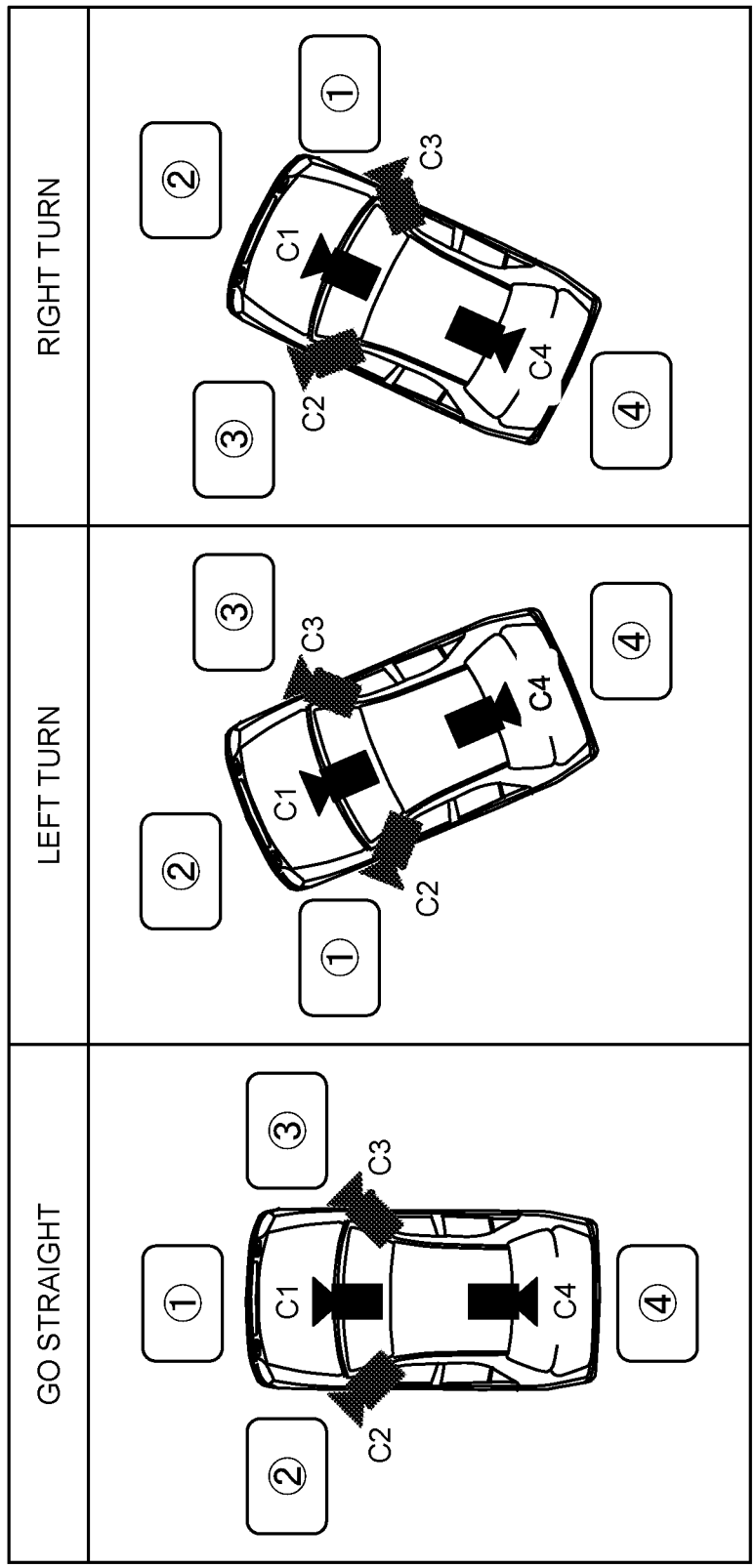
FIG. 5 is a conceptual diagram for explaining an example of dynamic setting of the camera priority according to an embodiment of the present disclosure.

FIG. 5 is a conceptual diagram for explaining an example of the dynamic setting of the priority of the cameras C1 to Cn. In the example shown in FIG. 5, the vehicle 100 includes a front camera C1, a left front camera C2, a right front camera C3, and a rear camera C4. The priority of the cameras C1 to C4 depends on a direction of travel of the vehicle 100. That is, the priority of a camera C whose view direction is closer to the direction of travel is set to be higher than the priority of a camera C whose view direction is farther from the direction of travel. The circled numbers in FIG. 5 represent the priority.

More specifically, in a case where the vehicle 100 goes straight, the direction of travel of the vehicle 100 is a forward direction. In this case, the front camera C1 has the highest priority, and the rear camera C4 has the lowest priority. The priority of the left front camera C2 and the priority of the right front camera C3 are lower than that of the front camera C1 and higher than that of the rear camera C4.

In a case where the vehicle 100 makes a left turn, the direction of travel of vehicle 100 is a left direction. In this case, the priority of the left front camera C2 is higher than the priority of the right front camera C3. The priority of the front camera C1 is lower than that of the left front camera C2 and higher than that of the right front camera C3. The rear camera C4 has the lowest priority.

In a case where the vehicle 100 makes a right turn, the direction of travel of vehicle 100 is a right direction. In this case, the priority of the right front camera C3 is higher than the priority of the left front camera C2. The priority of the front camera C1 is lower than that of the right front camera C3 and higher than that of the left front camera C2. The rear camera C4 has the lowest priority.

Figure 6:
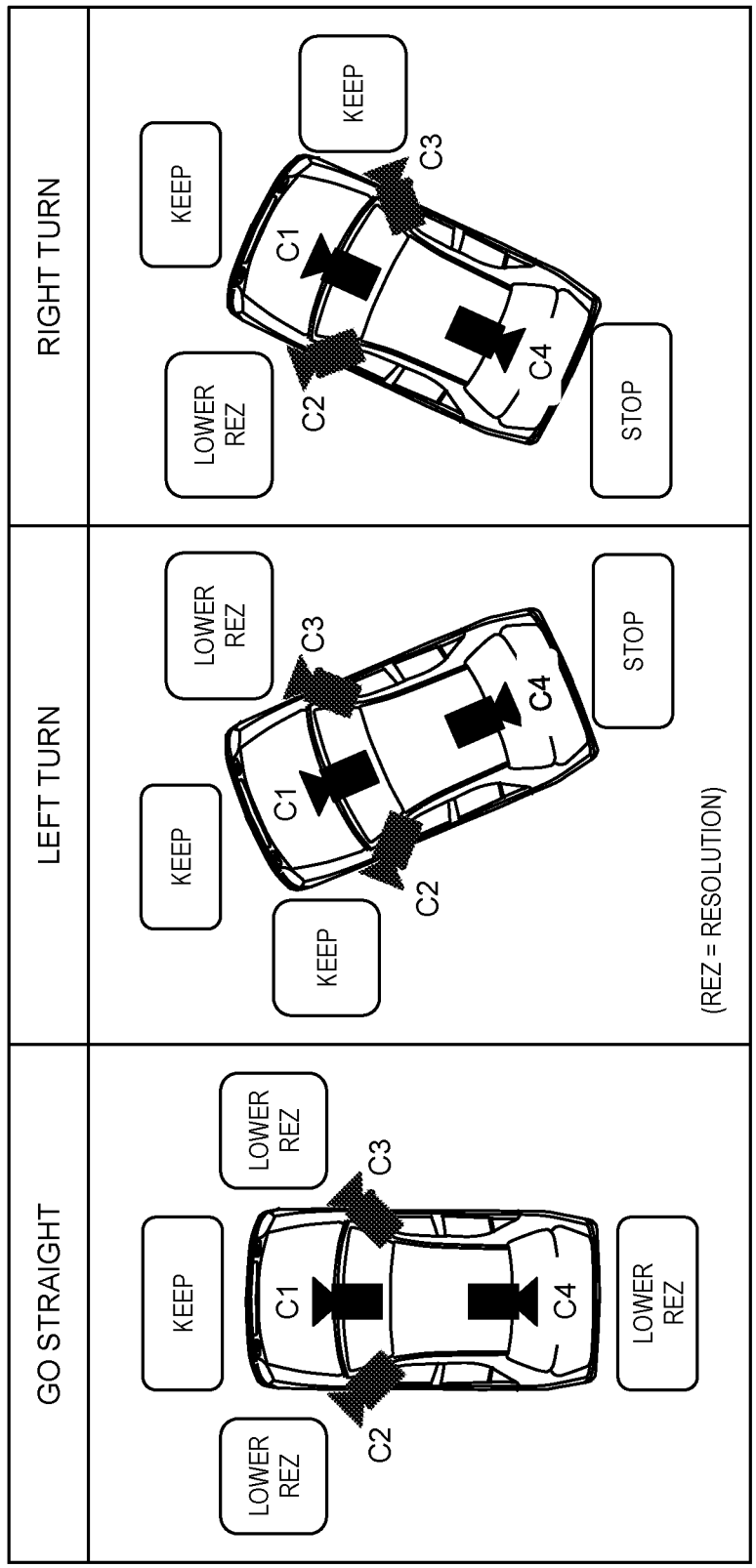
FIG. 6 is a conceptual diagram for explaining an example of the data amount coordinating process considering the camera priority according to an embodiment of the present disclosure.

FIG. 6 is a conceptual diagram for explaining an example of the data amount coordinating process considering the priority of cameras C1 to C4.

In the case where the vehicle 100 goes straight, the data amount coordinating unit 105 keeps the resolution of the video data S1 captured by the front camera C1 having the highest priority at the default value. That is, the data amount coordinating unit 105 does not reduce but keeps the amount of transmission data of the video data S1 captured by the front camera C1 having the highest priority. On the other hand, the data amount coordinating unit 105 reduces the resolutions of the video data S2 to S4 captured by the cameras C2 to C4 having the relatively low priority to be lower than the default value. For example, the resolution is decreased from the default value of 1080p to 360p.

In the case where the vehicle 100 makes a left turn, the data amount coordinating unit 105 keeps the resolutions of the video data S1 and S2 captured by the cameras C1 and C2 having the relatively high priority at the default values. That is, the data amount coordinating unit 105 does not reduce but keeps the amounts of transmission data of the video data S1 and S2 captured by the cameras C1 and C2 having the relatively high priority. On the other hand, the data amount coordinating unit 105 reduces the resolution of the video data S3 captured by the right front camera C3 having the relatively low priority to be lower than the default value. Further, the data amount coordinating unit 105 stops the transmission of the video data S4 captured by the rear camera C4 having the lowest priority.

In the case where the vehicle 100 makes a right turn, the data amount coordinating unit 105 keeps the resolutions of the video data S1 and S3 captured by the cameras C1 and C3 having the relatively high priority at the default values. That is, the data amount coordinating unit 105 does not reduce but keeps the amounts of transmission data of the video data S1 and S3 captured by the cameras C1 and C3 having the relatively high priority. On the other hand, the data amount coordinating unit 105 reduces the resolution of the video data S2 captured by the left front camera C2 having the relatively low priority to be lower than the default value. Further, the data amount coordinating unit 105 stops the transmission of the video data S4 captured by the rear camera C4 having the lowest priority.

Figure 7:
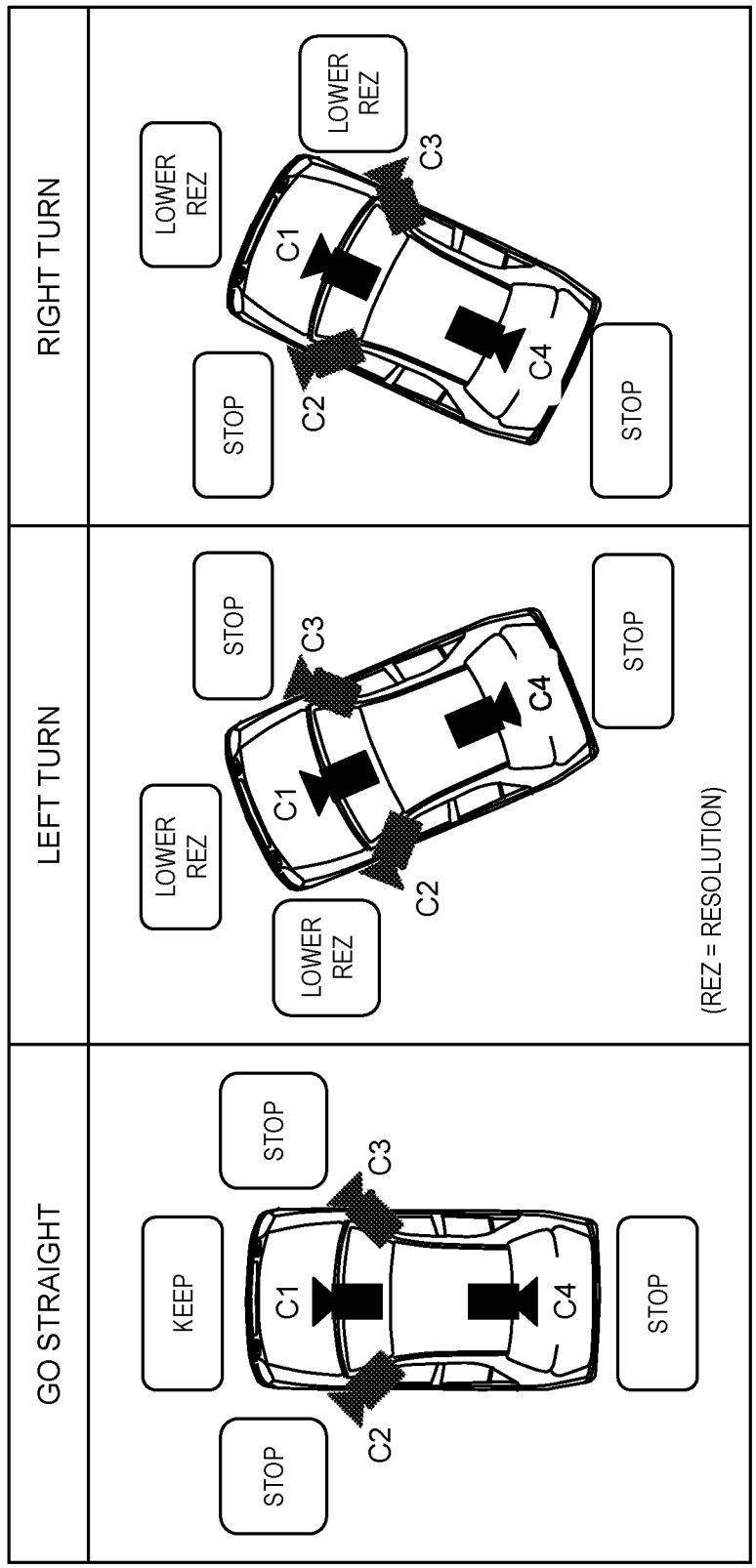
FIG. 7 is a conceptual diagram for explaining another example of the data amount coordinating process considering the camera priority according to the embodiment of the present disclosure.

FIG. 7 is a conceptual diagram for explaining another example of the data amount coordinating process considering the priority of the cameras C1 to C4. In the example shown in FIG. 7, the amount of data reduction is larger than that in the example shown in FIG. 6.

In the case where the vehicle 100 goes straight, the data amount coordinating unit 105 keeps the resolution of the video data S1 captured by the front camera C1 having the highest priority at the default value. That is, the data amount coordinating unit 105 does not reduce but keeps the amount of transmission data of the video data S1 captured by the front camera C1 having the highest priority. On the other hand, the data amount coordinating unit 105 stops the transmission of the video data S2 to S4 captured by the cameras S2 to S4 having the relatively low priority.

In the case where the vehicle 100 makes a left turn, the data amount coordinating unit 105 reduces the resolutions of the video data S1 and S2 captured by the cameras C1 and C2 having the relatively high priority to be lower than the default values. Further, the data amount coordinating unit 105 stops the transmission of the video data S3 and S4 captured by the cameras C3 and C4 having the relatively low priority.

In the case where the vehicle 100 makes a right turn, the data amount coordinating unit 105 reduces the resolutions of the video data S1 and S3 captured by the cameras C1 and C3 having the relatively high priority to be lower than the default values. Further, the data amount coordinating unit 105 stops the transmission of the video data S2 and S4 captured by the cameras C2 and C4 having the relatively low priority.

The direction of travel of the vehicle 100 is acquired from the vehicle state information such as a steering angle, a blinker state, a gear position and the like of the vehicle 100. Alternatively, the direction of travel of the vehicle 100 may be acquired based on a target route of the vehicle 100. Travel direction information DIR is information indicating the direction of travel of the vehicle 100. The priority policy information POL indicates a dynamic setting policy of the priority as exemplified in FIG. 5. The priority setting unit 105P acquires the travel direction information DIR and sets the priority of the plurality of cameras C1 to Cn based on the travel direction information DIR and the priority policy information POL (see FIG. 4). Then, the data amount coordinating unit 105 executes the data amount coordinating process in consideration of the set priority.

As described above, the data amount coordinating process is executed such that the amount of transmission data of the video data S captured by a camera C having a higher priority becomes larger. That is, it is possible to secure the amount of transmission data of the video data S captured by a camera C with a high priority as much as possible while suppressing the total amount of data Y of the video data S1 to Sn. In other words, it is possible to suppress the transmission delay of the video data Si to Sn while ensuring the accuracy of the remote operation of the vehicle 100 performed by the remote operator O as much as possible.

4. Data Amount Coordinating Process Based on Fix Level

As described above, the amount of excess X of the plurality of video data S1 to Sn is expressed by Equation (1). The determination unit 104 calculates the amount of excess X according to Equation (1). As the amount of excess X increases, an amount of transmission data to be reduced in the data amount coordinating process increases accordingly. Here, the amount of transmission data to be reduced, that is, a content of the data amount coordinating process may be switched (changed) in stages. For this purpose, a concept of "Fix level FL" is introduced.

FIG. 8 is a conceptual diagram for explaining an example of setting of the Fix level. When the amount of excess X is a positive value, the communication speed Z decreases and the necessity of the data amount coordinating process is high. On the other hand, when the amount of excess X is a negative value, the communication speed Z is high and the necessity of the data amount coordinating process is low. From such a viewpoint, the amount of excess X is classified into a plurality of Fix levels FL.

For example, three threshold values X0, XN, XP regarding the amount of excess X are considered. The threshold value XN is a negative value, and the threshold value XP is a positive value. The threshold value X0 is greater than XN and less than XP (XP>X0>XN). The threshold value X0 may be 0. When the amount of excess X is in a range from XN to X0, the Fix level FL is set to a default value "0." When the amount of excess X is in a range from X0 to XP, the Fix level FL is set to "−1." When the amount of excess X is equal to or greater than XP, the Fix level FL is set to "−2." On the other hand, when the amount of excess X is equal to or less than XN, the Fix level FL is set to "+1."

When the Fix level FL is the default value "0", the data amount coordinating process is not performed. When the Fix level FL is "−1" or "−2", the data amount coordinating process is performed. In particular, the amount of data reduction in the case where the Fix level FL is "−2" is set to be larger than that in the case where the Fix level FL is "−1." For example, the data amount coordinating process as shown in FIG. 6 is performed when the Fix level FL is "−1", and the data amount coordinating process as shown in FIG. 7 is performed when the Fix level FL is "−2." In this manner, the content of the data amount coordinating process is switched in stages according to the Fix level FL.

Figure 9:
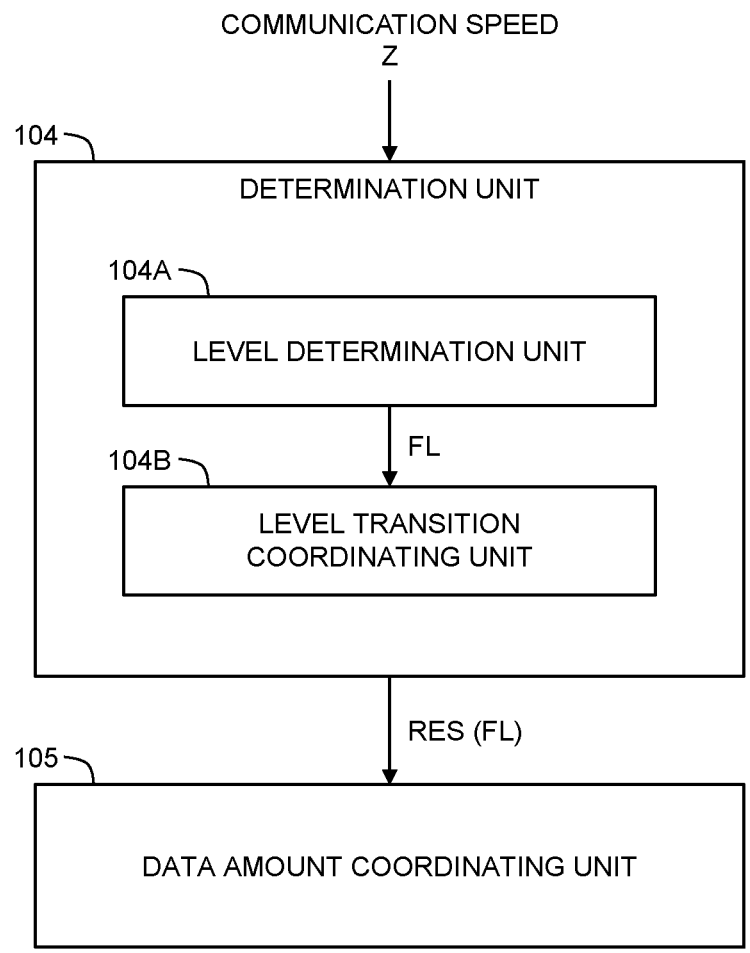
FIG. 9 is a block diagram showing an example of a functional configuration related to the Fix level according to an embodiment of the present disclosure.

FIG. 9 is a block diagram showing an example of a functional configuration related to the Fix level FL. The determination unit 104 includes a level determination unit 104A. The level determination unit 104A determines to which of the plurality of Fix levels FL the amount of excess X belongs. The determination result information RES indicating the result of determination by the determination unit 104 includes the Fix level FL to which the amount of excess X belongs.

The data amount coordinating unit 105 switches (changes) the content of the data amount coordinating process according to the Fix level FL to which the amount of excess X belongs. For example, when the Fix level FL is "−1", the data amount coordinating unit 105 executes the data amount coordinating process as shown in FIG. 6. When the Fix level FL is "−2", the data amount coordinating unit 105 executes the data amount coordinating process as shown in FIG. 7.

It should be noted that when the Fix level is "+1", the communication speed Z has enough spare. Therefore, the data amount coordinating unit 105 may increase the resolution of at least one of the plurality of video data S1 to Sn to be higher than the default value. For example, the data amount coordinating unit 105 increases the resolution of the video data S captured by a camera C having the highest priority to be higher than the default value. As a result, visibility of the video data S is further improved.

The determination unit 104 may further include a level transition coordinating unit 104B. When the Fix level FL to which the amount of excess X belongs transitions (changes), the level transition coordinating unit 104B coordinates a slope (rate of change) of the Fix level FL.

Figure 10:
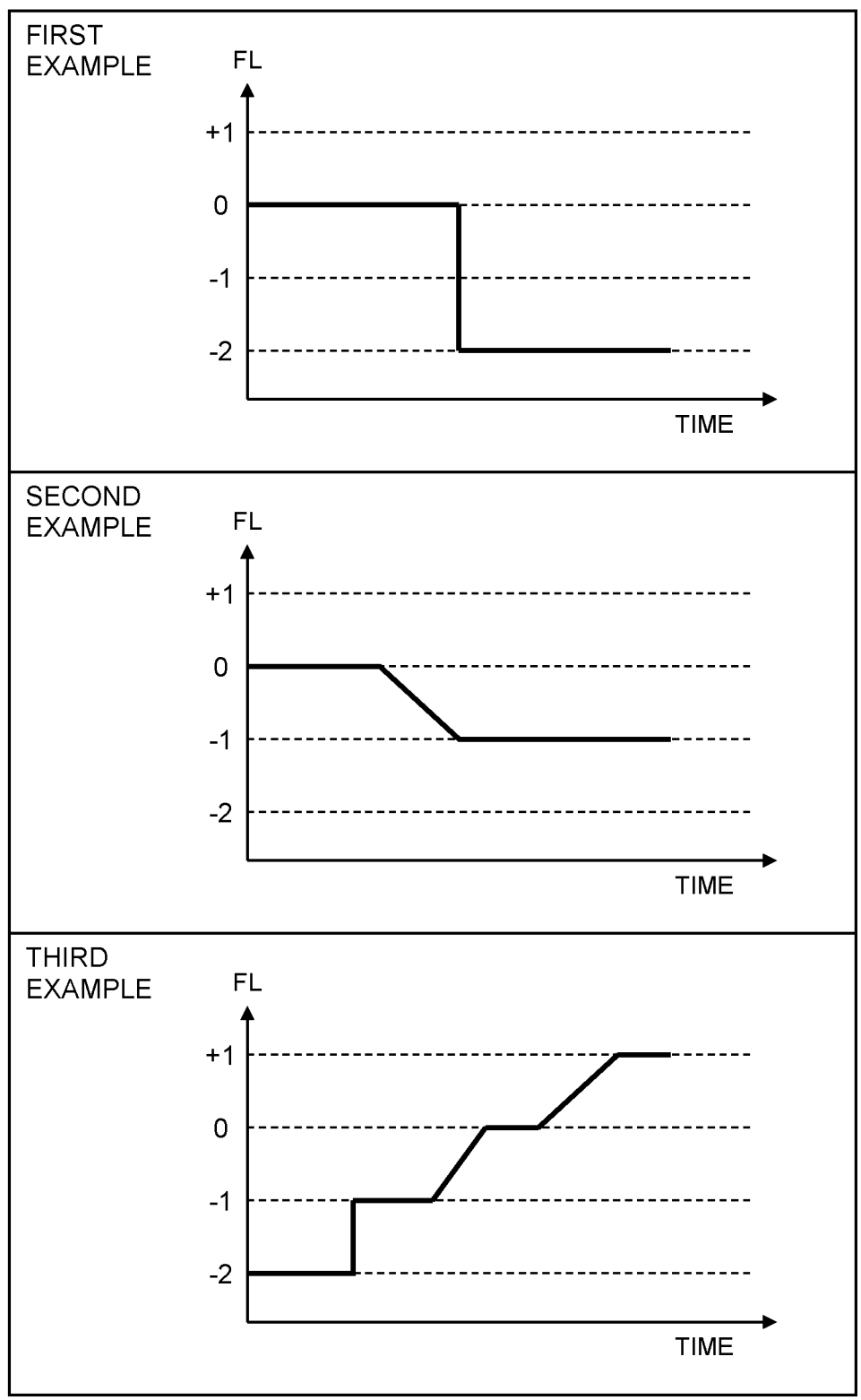
FIG. 10 is a conceptual diagram for explaining an example of transition of the Fix level according to an embodiment of the present disclosure.

FIG. 10 is a conceptual diagram for explaining examples of the transition of the Fix level FL. In a first example, the Fix level FL decreases greatly. In this case, the level transition coordinating unit 104B immediately decreases the Fix level FL in consideration of safety.

In a second example, an amount of decrease in the Fix level FL is relatively small. In this case, the level transition coordinating unit 104B may slowly decrease the Fix level FL. When the Fix level FL decreases slowly, the resolution of the video data S also decreases slowly.

In a third example, the Fix level FL increases. If the resolution of the video data S is rapidly increased, the remote operator O may feel uncomfortable. In view of the above, the level transition coordinating unit 104B may slowly increase the Fix level FL. When the Fix level FL increases slowly, the resolution of the video data S also increases slowly.

As described above, the content of the data amount coordinating process is switched according to the Fix level FL. Since the content of the data amount coordinating process is determined in advance, it is possible to efficiently perform the data amount coordinating process.

5. Example of Vehicle 5-1. Configuration Example

Figure 11:
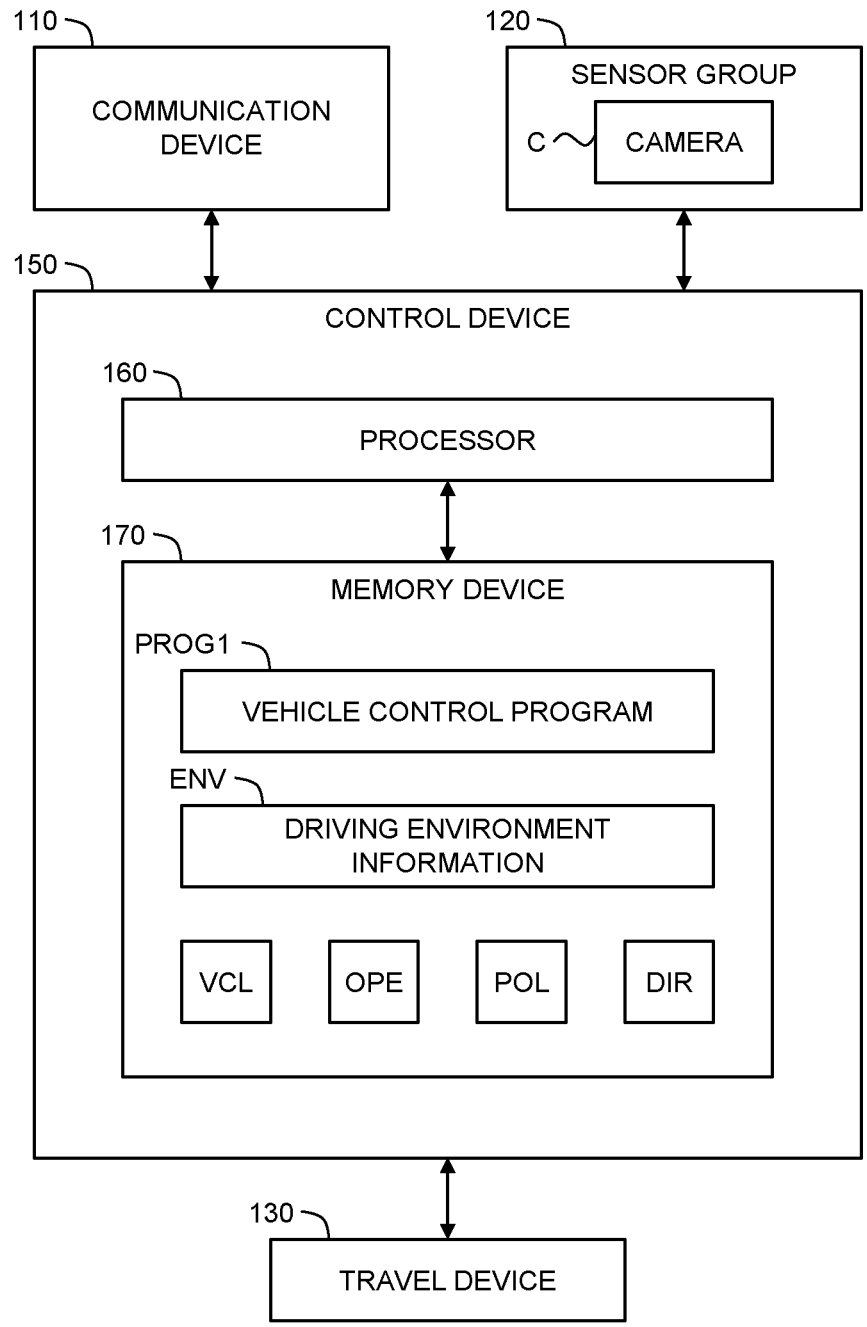
FIG. 11 is a block diagram showing a configuration example of a vehicle according to an embodiment of the present disclosure.

FIG. 11 is a block diagram showing a configuration example of the vehicle 100. The vehicle 100 includes a communication device 110, a sensor group 120, a travel device 130, and a control device (controller) 150.

The communication device 110 communicates with the outside of the vehicle 100. For example, the communication device 110 communicates with the remote operator terminal 200 and the management device 300. The communication device 110 corresponds to the communication unit 101 shown in FIG. 2.

The sensor group 120 includes a recognition sensor, a vehicle state sensor, a position sensor, and the like. The recognition sensor recognizes (detects) a situation around the vehicle 100. Examples of the recognition sensor include the cameras C (C1 to Cn), a laser imaging detection and ranging (LIDAR), a radar, and the like. The vehicle state sensor detects a state of the vehicle 100. Examples of the vehicle state sensor include a speed sensor, an acceleration sensor, a yaw rate sensor, a steering angle sensor, and the like. The position sensor detects a position and an orientation of the vehicle 100. For example, the position sensor includes a global navigation satellite system (GNSS).

The travel device 130 includes a steering device, a driving device, and a braking device. The steering device turns wheels. For example, the steering device includes an electric power steering (EPS) device. The driving device is a power source that generates a driving force. Examples of the drive device include an engine, an electric motor, an in-wheel motor, and the like. The braking device generates a braking force.

The control device 150 is a computer that controls the vehicle 100. The control device 150 includes one or more processors 160 (hereinafter simply referred to as a processor 160) and one or more memory devices 170 (hereinafter simply referred to as a memory device 170). The processor 160 executes a variety of processing. For example, the processor 160 includes a central processing unit (CPU). The memory device 170 stores a variety of information necessary for the processing by the processor 160. Examples of the memory device 170 include a volatile memory, a non-volatile memory, a hard disk drive (HDD), a solid state drive (SSD), and the like. The control device 150 may include one or more electronic control units (ECUs).

A vehicle control program PROG1 is a computer program executed by the processor 160. The functions of the control device 150 are implemented by the processor 160 executing the vehicle control program PROG1. The vehicle control program PROG1 is stored in the memory device 170. The vehicle control program PROG1 may be recorded on a non-transitory computer-readable recording medium.

5-2. Driving Environment Information

The control device 150 uses the sensor group 120 to acquire driving environment information ENV indicating a driving environment for the vehicle 100. The driving environment information ENV is stored in the memory device 170.

The driving environment information ENV includes surrounding situation information indicating a result of recognition by the recognition sensor. For example, the surrounding situation information includes the images IMG (the video data S1 to Sn) captured by the cameras C. The surrounding situation information further includes object information regarding an object around the vehicle 100.

Examples of the object around the vehicle 100 include a pedestrian, another vehicle (e.g., a preceding vehicle, a parked vehicle, etc.), a white line, a traffic signal, a sign, a roadside structure, and the like. The object information indicates a relative position and a relative velocity of the object with respect to the vehicle 100.

In addition, the driving environment information ENV includes vehicle state information indicating the vehicle state detected by the vehicle state sensor.

Furthermore, the driving environment information ENV includes vehicle position information indicating the position and the orientation of the vehicle 100. The vehicle position information is acquired by the position sensor. Highly accurate vehicle position information may be acquired by performing a well-known localization using map information and the surrounding situation information (the object information).

5-3. Vehicle Travel Control

The control device 150 executes vehicle travel control that controls travel of the vehicle 100. The vehicle travel control includes steering control, driving control, and braking control. The control device 150 executes the vehicle travel control by controlling the travel device 130 (i.e., the steering device, the driving device, and the braking device).

The control device 150 may execute autonomous driving control based on the driving environment information ENV. More specifically, the control device 150 generates a travel plan of the vehicle 100 based on the driving environment information ENV. Further, the control device 150 generates, based on the driving environment information ENV, a target trajectory required for the vehicle 100 to travel in accordance with the travel plan. The target trajectory includes a target position and a target speed. Then, the control device 150 executes the vehicle travel control such that the vehicle 100 follows the target trajectory.

5-4. Processing Related to Remote Operation

Hereinafter, the case where the remote operation of the vehicle 100 is performed will be described. The control device 150 communicates with the remote operator terminal 200 via the communication device 110.

The control device 150 transmits the vehicle information VCL to the remote operator terminal 200. The vehicle information VCL is information necessary for the remote operation by the remote operator O, and includes at least a part of the driving environment information ENV described above. For example, the vehicle information VCL includes the surrounding situation information (especially, the image IMG). The vehicle information VCL may further include the vehicle state information and the vehicle position information.

In addition, the control device 150 receives the remote operation information OPE from the remote operator terminal 200. The remote operation information OPE is information regarding the remote operation by the remote operator O. For example, the remote operation information OPE includes an amount of operation performed by the remote operator O. The control device 150 performs the vehicle travel control in accordance with the received remote operation information OPE.

Furthermore, the control device 150 has the functions of the video data acquisition unit 102, the communication state acquisition unit 103, the determination unit 104, and the data amount coordinating unit 105 described above (see FIGS. 2, 4, and 8). The priority policy information POL is generated in advance and stored in the memory device 170. The travel direction information DIR is acquired from the vehicle state information (e.g., a steering angle, a blinker state, a gear position). The travel direction information DIR may be acquired based on a target route of the vehicle 100. The control device 150 executes the processing shown in FIG. 3, and executes the data amount coordinating process as necessary.

What is claimed is:

1. A control device for controlling a moving body, wherein the moving body is a target of a remote operation performed by a remote operator and has a plurality of cameras,
the control device comprising one or more processors configured to:
acquire a plurality of video data respectively captured by the plurality of cameras, as transmission target data to be transmitted to a remote operator terminal on a side of the remote operator;
acquire information on a communication speed of a communication from the moving body to the remote operator terminal;
determine whether or not data reduction is necessary for limiting a total amount of data of the plurality of video data per second to the communication speed or less; and
when it is determined that the data reduction is necessary, execute a data amount coordinating process that reduces an amount of transmission data of at least one of the plurality of video data such that the total amount of data is limited to the communication speed or less.

2. The control device according to claim 1, further comprising one or more memory devices configured to store priority policy information indicating a setting policy of priority of the plurality of cameras, wherein
the one or more processors execute the data amount coordinating process based on the priority policy information such that the amount of transmission data of video data captured by a camera with a higher priority becomes larger.

3. The control device according to claim 2, wherein
the plurality of cameras include a first camera and a second camera having a lower priority than the first camera,
the plurality of video data include first video data captured by the first camera and second video data captured by the second camera, and
in the data amount coordinating process, the one or more processors reduce resolution of the second video data to be lower than a default value without reducing the amount of transmission data of the first video data.

4. The control device according to claim 2, wherein
the plurality of cameras include a first camera and a second camera having a lower priority than the first camera,
the plurality of video data include first video data captured by the first camera and second video data captured by the second camera, and
in the data amount coordinating process, the one or more processors transmit the first video data and stop transmission of the second video data.

5. The control device according to claim 2, wherein
the priority of the plurality of cameras depends on a direction of travel of the moving body, the priority of a camera whose view direction is closer to the direction of travel is higher than the priority of a camera whose view direction is farther from the direction of travel, and in the data amount coordinating process, the one or more processors acquire information including the direction of travel of the moving body and set the priority of the plurality of cameras based on the direction of travel and the priority policy information.

6. The control device according to claim 1, wherein the one or more processors are configured to:

compare a default value of the total amount of data of the plurality of video data per second with the communication speed; and determine that the data reduction is necessary, when the default value of the total amount of data exceeds the communication speed.

7. The control device according to claim 6, wherein the one or more processors are configured to:

calculate an amount of excess of the default value of the total amount of data of the plurality of video data per second with respect to the communication speed;

determine to which of a plurality of levels the amount of excess belongs; and switch a content of the data amount coordinating process according to a level to which the amount of excess belongs.

8. A control method for controlling a moving body, wherein the moving body is a target of a remote operation performed by a remote operator and has a plurality of cameras, the control method comprising:

acquiring a plurality of video data respectively captured by the plurality of cameras, as transmission target data to be transmitted to a remote operator terminal on a side of the remote operator;

acquiring information on a communication speed of a communication from the moving body to the remote operator terminal;

determining whether or not data reduction is necessary for limiting a total amount of data of the plurality of video data per second to the communication speed or less; and when it is determined that the data reduction is necessary, executing a data amount coordinating process that reduces an amount of transmission data of at least one of the plurality of video data such that the total amount of data is limited to the communication speed or less.

9. A non-transitory computer-readable recording medium on which a control program for controlling a moving body is recorded, wherein the moving body is a target of a remote operation performed by a remote operator and has a plurality of cameras, the control program, when executed by a computer, causing the computer to:

acquire a plurality of video data respectively captured by the plurality of cameras, as transmission target data to be transmitted to a remote operator terminal on a side of the remote operator;

acquire information on a communication speed of a communication from the moving body to the remote operator terminal;

determine whether or not data reduction is necessary for limiting a total amount of data of the plurality of video data per second to the communication speed or less; and when it is determined that the data reduction is necessary, execute a data amount coordinating process that reduces an amount of transmission data of at least one of the plurality of video data such that the total amount of data is limited to the communication speed or less.

* * * * *